May 6, 1952      G. L. MARVIN      2,595,474
TRAILER PLATFORM STABILIZING STRUCTURE
Filed April 14, 1949
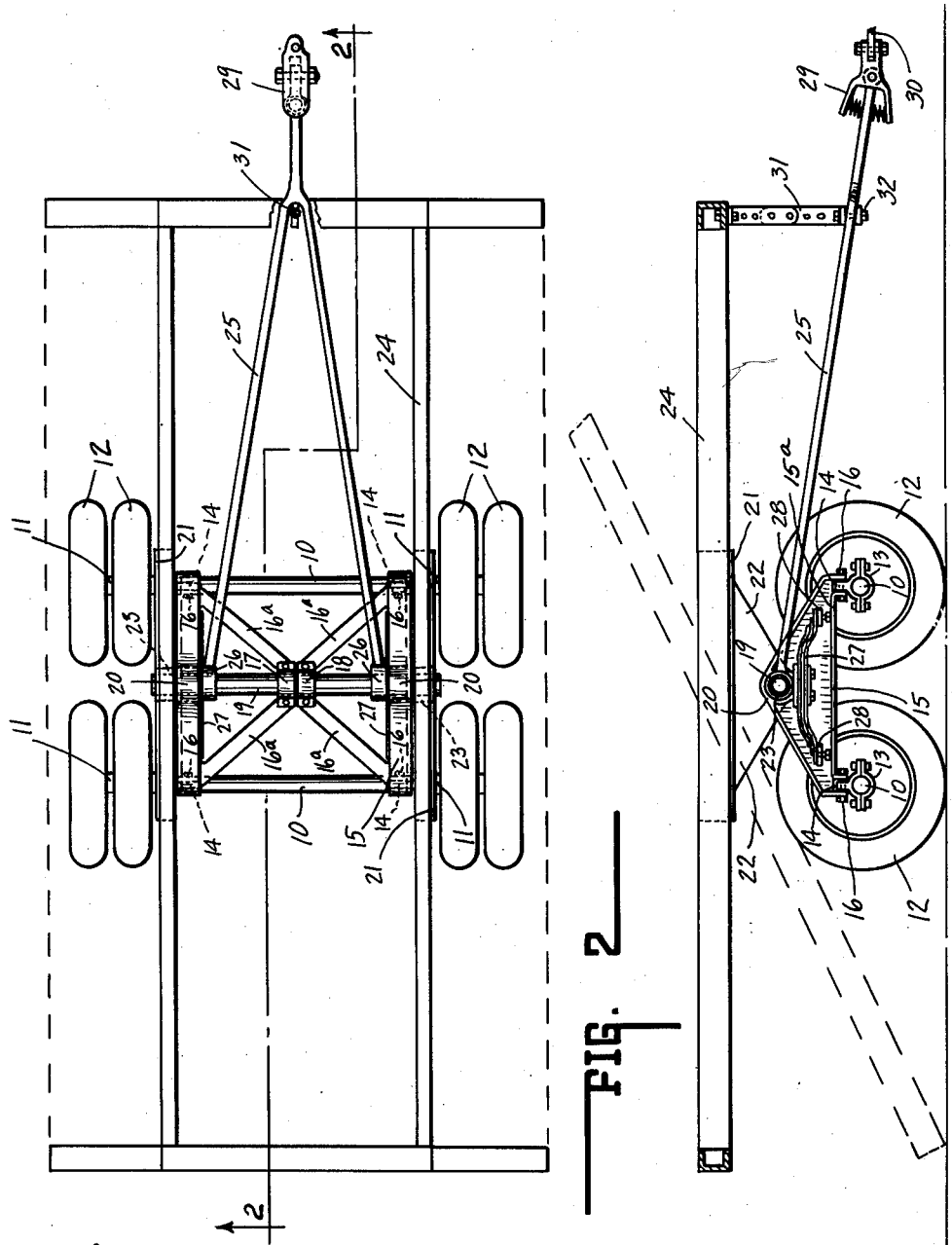
INVENTOR.
GREGORY L. MARVIN.
BY
Lockwood, Goldsmith & Galt,
ATTORNEYS.

Patented May 6, 1952

2,595,474

UNITED STATES PATENT OFFICE 2,595,474

TRAILER PLATFORM STABILIZING STRUCTURE

Gregory L. Marvin, Indianapolis, Ind.

Application April 14, 1949, Serial No. 87,418

1 Claim. (Cl. 280—33.4)

This invention relates to a trailer frame support structure and more particularly to a support structure designed to stabilize the platform of a trailer in a substantially horizontal position.

It is the primary object of this invention to provide a support structure for use with a tandem wheel type trailer which will permit differential up and down movement of the wheels over irregular road surfaces while at the same time will maintain the platform of the trailer in a substantially horizontal, balanced position.

It is a further object of this invention to provide a towing bar or "hitching" member for connection to the draw bar of the drawing vehicle, together with means associated therewith for maintaining the member at a predetermined level above the ground.

It is a still further object of the present invention to utilize said "hitching" member as a stabilizer to maintain the platform of the trailer in a substantially horizontal position.

It is well recognized that there are today many statutory requirements that affect the construction of such trailers. It is sometimes difficult to reconcile these requirements with the structural needs thereof. Yet in the present invention, the statutory requirements are observed and some of the normal problems attending such compliance are overcome. For example, it is normally difficult to construct the tandem wheels as close together as required and still realize a smooth balanced movement of the trailer bed and platform, particularly over rough uneven roadbeds. This, however, is accomplished in the present invention by the use of a separate and independent support member for the platform, in combination with a wheel supporting frame. The wheel supporting frame absorbs the differential movement of the respective wheels as each encounters irregular road beds, and consequently permits the platform supporting member to remain relatively unaffected thereby.

It is also well recognized that the "hitch" or tongue, by means of which the trailer is connected to the wheeled vehicle drawing it, must generally be connected manually. This entails the necessity of the operator actually effecting coupling connection himself. In the present invention, on the other hand, the "hitch" or tongue is so constructed and arranged that it can be maintained and adjusted to a predetermined height above the ground, which is on the same plane with the draw bar of the drawing vehicle, to which draw bar the "hitch" is connected. This arrangement and construction makes it possible for the drawing vehicle and the trailer to be "hitched" or coupled together automatically without the necessity of the operator doing it manually.

The full nature of the invention will be understood from the accompanying drawings and the following description and claim:

Fig. 1 is a bottom plan view of the invention.

Fig. 2 is a section view thereof taken on line 2—2 in the direction of the arrows.

In the drawings there are shown a pair of spaced, transversely extending axles 10 which have spindles 11 secured to their ends to support the wheels 12. Mounted about the axles adjacent each of their ends and spaced inwardly of the spindles are the straddle clamps 13 which have upwardly extending bosses 14 formed integrally therewith. Each boss is in substantial alignment with its corresponding boss on the other axle.

Connecting the two axles are a pair of substantially triangularly shaped upstanding members 15 which are loosely pinned to the bosses 14 through the medium of the pins 16. Integral with said members 15 and extending inwardly and upwardly from the extremities of the base 15a thereof are the struts or bracing members 16a. At the meeting ends of each pair of struts there is formed a cylindrical casting or collar 17 and 18, each of which is in alignment with the other and both being in abutting relation one to the other.

Extending through the collars and rockably mounted therein is the bolster or pivot shaft 19. The ends of this shaft also extend through the collars 20 formed adjacent the apex of the triangular members 15 and it is rockably carried thereby.

The shaft 19 also carries the longitudinally disposed trailer platform supporting members 21 which have downwardly converging arms 22 that meet in a cylindrically formed casting 23. It is through these castings that the shaft extends. The platform 24 of the trailer rests upon and is secured to the members 21 which are in turn supported by the pivot shaft as aforesaid.

Extending forwardly of the trailer is the substantially V-shaped hitch or towing bar 25 which is adapted for connection to the tractor. At the end of each arm of the V there is formed a collar 26 which loosely embraces and envelopes the shaft 19. Secured to the collars 26 and positioned immediately therebelow are the multiple leaf springs 27 which rest fore and aft upon the brackets 28 formed on the upper face of the bottom portion 15a of the members 15. At the free end of the V-shaped hitch or towing bar is the spring provided coupling 29 which is adapted to receive and have pinned thereto the draw bar 30 of the tractor. Extending downwardly from the forward end of the platform 24 is the adjustable support arm 31 which is adapted to embrace, by means of the clamping member 32, the hitch or towing bar. By adjusting the support arm 31 the hitch can be maintained at the desired point above the ground on the same plane as the draw bar 30 of the tractor.

It is also clear that the adjustable support member 31 will help keep the platform 24 in a horizontal position when loaded or empty. When it is desired to load the trailer, it is possible for the platform to be tilted by unclamping the clamp member 32 thereby freeing the support member 31 from the hitch 25 and enabling the platform to be tilted as shown in the dotted lines in Fig. 2.

When the platform is loaded and the support member is adjusted so that the towing bar will be at the desired level, the platform will be stabilized by the restraining action of the multiple leaf springs 27. This is true for the reason that any tendency of the platform to tilt in response to irregular road conditions would be transmitted through the support member 31 to the towing bar 25. This tendency is counteracted by the action of the stabilizing springs 27.

The invention claimed is:

A trailer platform stabilizing structure for a trailer having a pair of wheel supported axles, comprising a pair of opposed triangularly shaped upstanding members each being connected to and supported by said axles, said members having an opening formed adjacent their apices, a transversely disposed shaft extending through said openings and supported by said members, said members having a strut converging inwardly and upwardly from each end thereof, said struts having collars formed at their meeting ends respectively adapted to loosely embrace said shaft centrally thereof, a platform supporting frame having a centrally disposed depending portion adjacent each side thereof, said depending portions having an opening formed through their lower ends for reception therewithin of said shaft, spring means connected to the base portion of said members, a substantially V-shaped towing bar structure comprising a pair of arms having openings formed in the ends thereof adapted to loosely receive said shaft therethrough, said arm ends being rigidly connected to the upper portion of said springs centrally thereof, and an adjustable member depending from the forward end of said platform and having means for detachable connection to said towing bar structure adjacent the forward end thereof, said towing bar structure having a coupling connection at its forwardmost end adapted for connection to the draw bar of the trailer drawing vehicle.

GREGORY L. MARVIN.

REFERENCES CITED

The following references are of record in the file of this patent:

UNITED STATES PATENTS

| Number | Name | Date |
|---|---|---|
| 1,840,435 | Davis | Jan. 12, 1932 |
| 2,134,233 | McKone | Oct. 25, 1938 |
| 2,217,871 | Lindgren | Oct. 15, 1940 |
| 2,260,574 | Martin | Oct. 28, 1941 |
| 2,332,326 | Lex | Oct. 19, 1943 |
| 2,475,971 | Livernois | July 12, 1949 |

FOREIGN PATENTS

| Number | Country | Date |
|---|---|---|
| 224,641 | Great Britain | Nov. 20, 1924 |